United States Patent [19]
Osujyo et al.

[11] 3,922,931
[45] Dec. 2, 1975

[54] SPEED CHANGE DEVICE FOR TRACTOR TRANSMISSIONS

[75] Inventors: Masahide Osujyo, Sakai; Naoya Tuda, Fujiidera; Yoshimi Ota, Sakai, all of Japan

[73] Assignee: Kubota Tekko Kabushiki Kaisha, Japan

[22] Filed: Jan. 4, 1974

[21] Appl. No.: 430,717

[52] U.S. Cl. .................... 74/745; 74/15.2; 74/687; 74/665 G
[51] Int. Cl.² ............... F16H 3/02; F16H 47/04; F16H 37/00; F16H 37/06
[58] Field of Search .......... 74/745, 740, 15.4, 15.2, 74/687, 665 G

[56] References Cited
UNITED STATES PATENTS

| | | | |
|---|---|---|---|
| 2,833,160 | 5/1958 | Morgan | 74/681 |
| 3,722,324 | 3/1973 | Cordner et al. | 74/687 |
| 3,733,912 | 5/1973 | Murayama et al. | 74/15.4 |

FOREIGN PATENTS OR APPLICATIONS

| | | | |
|---|---|---|---|
| 912,109 | 12/1962 | United Kingdom | 74/15.2 |
| 1,159,772 | 12/1963 | Germany | 74/745 |
| 841,101 | 6/1952 | Germany | 74/745 |

*Primary Examiner*—Samuel Scott
*Assistant Examiner*—Parshotam S. Lall
*Attorney, Agent, or Firm*—Armstrong, Nikaido & Wegner

[57] ABSTRACT

Improvements in a transmission of the three-shaft type in which a speed change system for driving the tractor and a speed change system for power takeoff are disposed in parallel to each other on the opposite sides of a main input shaft having gears for power transmission. A hydraulic transmission unit employed as the tractor-driving speed change system includes a hydraulic pump, a charge pump and a hydraulic motor which are aligned coaxially as a unit. The hydraulic transmission unit operates to drive the tractor at steplessly variable speeds, whilst the power takeoff system comprising gears gives stepwisely variable speeds. A secondary speed change unit is disposed in the rear of the hydraulic transmission unit and a power takeoff shaft extends rearward from the power takeoff system to provide live power takeoff independently of the speed of tractor and ground power takeoff in timed raltion to the tractor speed. Means for supporting the hydraulic transmission, for mounting and removing the same and for filtering and cooling the working oil are also disclosed.

11 Claims, 17 Drawing Figures

SPEED CHANGE DEVICE FOR TRACTOR TRANSMISSIONS

BACKGROUND OF THE INVENTION

The present invention relates to transmissions for tractors for agricultural, civil engineering and construction uses which have stepless speed change means for driving the tractor and power takeoff means operable at a suitable number of variable speeds and which exhibit improved performance.

Transmissions of tractors for use in agriculture, civil engineering and construction have much higher reduction ratios to give low speeds than those of motor vehicles and require a greater number of variable speeds. Accordingly, if the speed change means of the transmission is made up of gears, the speed change gear system becomes very complex and especially cumbersome to design and make and the shaft assembly accommodated in a narrow space are prone to objections. Moreover, it is required that the essential construction of the mechanism be simplified to the greatest possible extent while permitting versatile speed changes and can be manufactured at low cost. Particularly in the case where the transmission includes a so-called "live" PTO adapted for selective speed variation independently of the speed of travel of the tractor, utmost efforts have been made to make the construction simple and inexpensive.

Figure 1:
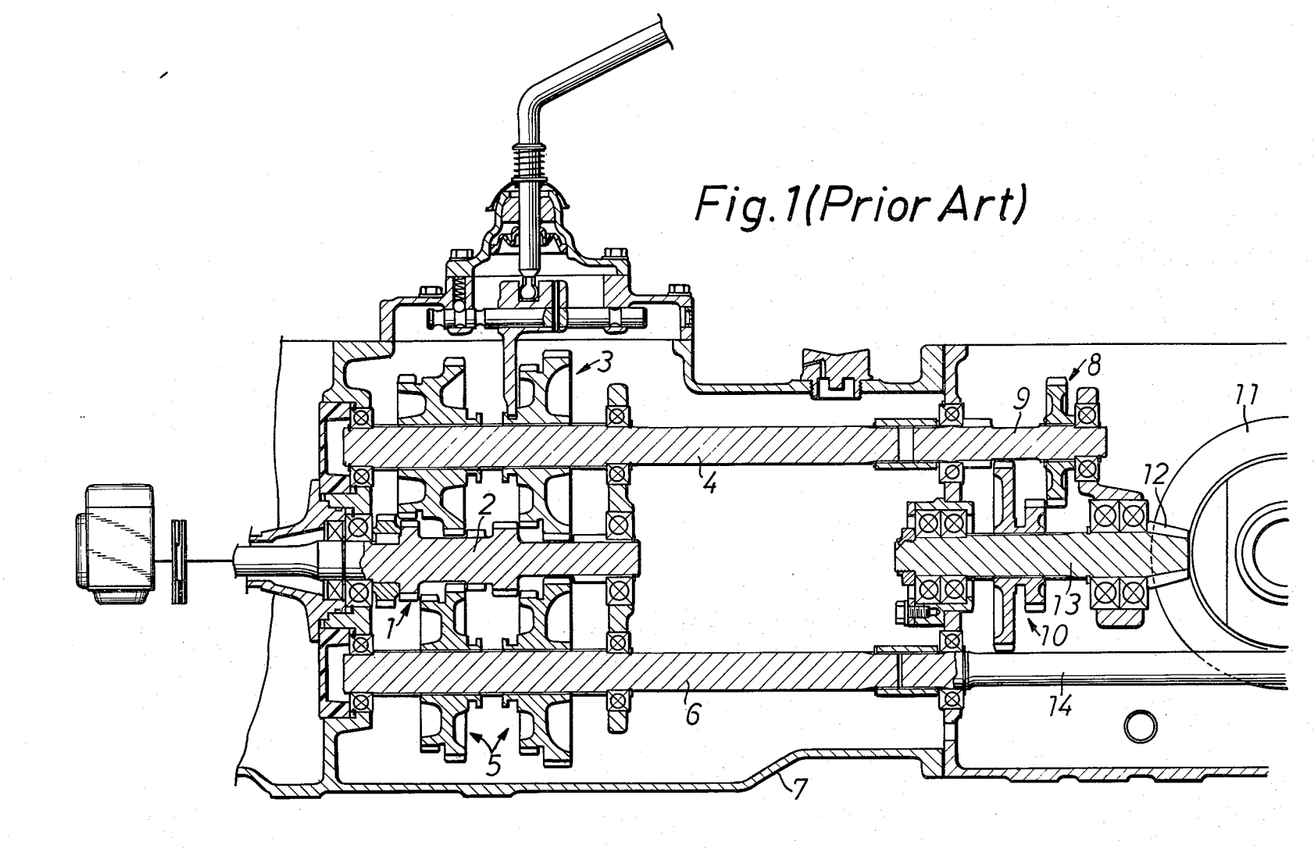
FIG. 1 is a sectional view showing the details of interior construction of a gear transmission according to the prior art including a primary speed change means of the three-shaft type and serving as a transmission for agricultural tractors.

Accordingly, an improved transmission has been proposed as disclosed in the specification of U.S. Pat. No. 3,733,912 granted to Kubota Iron & Machinery Works, Ltd., the employer of the present invention. The proposed transmission, which has won popularity, includes primary speed change means of simple construction wherein three shafts, i.e. input main shaft, driving counter shaft and power takeoff counter shaft which are supported in the transmission case in parallel are adapted to transmit the torque of the engine to the drive wheels and power takeoff means at varied speed rates. More specifically with reference to FIG. 1 the primary speed change means comprises an input main shaft 2 carrying power transmitting gears 1, an upper counter chaft 4 provided with a group of speed change gears 3 for driving the tractor and a lower counter shaft 6 provided with a group of speed change gears 5 for power takeoff, the counter shafts 4 and 6 being disposed on the opposite sides of the main shaft 2 (i.e. at upper and lower positions in the drawing), the three shafts being supported by a transmission case 7 in parallel. The speed change gear groups 3 and 5 are meshable (i.e. selectively meshable in the drawing) with the group of gears 1 on the main shaft 2, the opposing groups of speed change gears 3 and 5 being identical in the number of teeth. The upper counter shaft 4 extends rearward to provide an extension 9 carrying a gear 8 and connected to secondary speed change means comprising a bevel pinion shaft 13 having a gear 10 meshable with the gear 8 and a bevel pinion 12 meshing with a bevel gear 11. The lower counter shaft 6 likewise extends rearward and is connected to a power takeoff or PTO shaft 14. Although the primary speed change means of the transmission described above may serve the intended purpose because of its three-shaft construction, the stepwise speed change mechanism composed of the above-mentioned gear system is limited in the number of variable speeds. In fact, with the wide use of tractors in recent years, it has been desired to provide a transmission which is adapted for stepless speed change.

For this reason, so-called hydraulic transmissions have been provided which permit stepless speed change as disclosed in the specification of U.S. Pat. No. 3,122,025. The hydraulic transmission as employed in the tractor is advantageous in that the speed is variable steplessly from zero to a maximum by one lever, that the drive wheels can be mounted irrespective of the position of engine and that the speed is variable smoothly and quickly but, nevertheless, it has the drawback of being low in transmission efficiency and expensive to manufacture. Especially, the power takeoff which is essential to agricultural tractors must often be driven alone while the tractor is stopped to conduct mowing, removal of snow and like works, hence the need for so-called "live" power takeoff.

Further in the case where the hydraulic transmission is employed as a transmission for tractor, it is preferable to use an axial plunger type pump integrally with an wxial plunger motor to render the hydraulic transmission so compact as to be accommodated in a narrow space within the transmission case. However, if tractors incorporating hydraulic transmissions are to be manufactured individually, a variety of products will be made in small amounts, entailing a cost increase. Since the hydraulic transmision has an input shaft and output shaft which are in common with those of the gear transmission, the hydraulic transmission may be made in the form of a unit which can be incorporated into the gear transmission in replacing manner as desired, whereby the transmission case, input shaft, output shaft and the like may be made usable in common. Consequently, the product become available more inexpensively than those designed specifically for the use of hydraulic transmission. Conventionally, however, this results in the disadvantage that part of the accurately assembled and adjusted hydraulic transmissionn unit must be disassembled, which impairs the accuracy of the hydraulic transmission unit and permits foreign matters to get in.

Further in the case where the hydraulic transmission is to be used in the tractor, the hydraulic transmission unit must be accommodated in the narrow space of transmission case. The limited space available in the transmission case entails the problesm that even if the hydraulic pump and hydraulic motor are designed in the form of a compact unit, the hydraulic unit is very difficult to mount in place and to remove therefrom for maintenance and inspection after years of use. Moreover, the complicated piping for hydraulically connecting the pump to the motor would render such work difficult to carry out. Further the use of hydraulic transmission in tractor invariably necessitates valve means such as check valves and relief valves, which in turn involve technical and economical problems as to how the valve means are to be incorporated in the system. Inasmuch as the transmission case of tractor, whether hydraulic or gear type, generally serves also as an oil tank, there arises another problem as to how to filter the oil in the oil tank. This may be accomplished by an oil filter, which however, entails the necessity to completely eliminate oil leakage during the maintenance and inspection of the filter. The use of hydraulic transmission poses another problem as to what means to employ to cool the oil and to keep the hydraulic transmission operable reliably.

An object of this invention is to provide a transmission for tractors for use in agriculture, civil engineering and construction including primary speed change means of the foregoing three-shaft type wherein counter shafts for driving the tractor and power takeoff are disposed on the opposite sides of a main input shaft in parallel, the primary speed change means incorporating therein a removable hydraulic transmission unit in place of a tractor-driving speed change gear system so as to propel the tractor at steplessly variable forward and reverse speeds ranging from zero to the highest, the primary speed change means further including a power takeoff operable at the highest gear transmission efficiency independently of the travel of the tractor.

Another object of this invention is to provide a transmission for tractors including primary speed change means of the three-shaft type into which a hydraulic transmissionn unit is readily mountable in place of the tractor-driving speed change gear system thereof without the necessity to disassemble the hydraulic transmission unit.

Another object of this invention is to provide a transmission for tractors which permits a hydraulic transmission unit to be removably mounted in a primary transmission case readily without the need to disassemble a secondary transmission case.

Another object of this invention is to provide a transmission in which valves such as charge check valve, charge relief valve, high pressure relief valve and the like that are most susceptible to failure are removably mountable as a unit separately from the hydraulic pump and hydraulic motor to assure maintenance with greater ease.

Another object of this invention is to provide a transmission including a hydraulic transmission unit in which axial plunger type pump, axial plunger type motor and charge pump are incorporated as a unit, with the interior space of the pump and that of the motor communicating with each other, so that the oil will flow between the pump and motor through the intimately fitting surfaces thereof.

Another object of this invention is to provide a transmission in which the transmission case is used as the oil tank for a hydraulic transmission and which is equipped with oil filter means capable of filtering the oil reliably and easily and amenable to maintenance, inspection and replacement without permitting any oil leakage.

Another object of this invention is to provide a transmssion wherein the discharge pressure of a relief valve for a charge pump for compensating for the leak in the hydraulic pump is utilized pass the working oil forward and in which an oil cooler is provided at an intermediate portion of the oil passage, the oil cooler being adapted to be cooled by the radiator for cooling the tractor engine.

Another object of the present invention is to provide a hydraulic transmission which is completely prevented from acting reversely on and thereby moving the transmission operation controlling rod with its pressure moment, the controlling rod further being rendered very smooth and easy to manipulate to effect usual operation.

Another object of this invention is to provide a transmssion including a three-shaft type primary speed change means in which the main input shaft for power transmission is serviceable also as a speed change gear system for power takeoff even where a hydraulic transmission is used as the tractor-driving speed change system of the primary speed change means.

Another object of the present invention is to provide a transmssion including an additional simple mechanism which makes it possible to obtain so-called "ground" power takeoff in timed relation to the speed of tractor as well as so-called "live" power take off independent of the speed of tractor.

Still another object of the present invention is to provide a transmission which is so adapted that should the hydraulic transmission fail to operate, a power takeoff speed change shaft can drive an output shaft or, conversely, the power takeoff shaft or output shaft can rotate the engine to initiate the same into operation.

These and other objects and advantages of this invention will become more apparent from the following description of this invention with reference to the drawings showing the preferred embodiments.

DETAILED DESCRIPTION OF THE PREFERRED EMBODIMENTS

Figure 2:
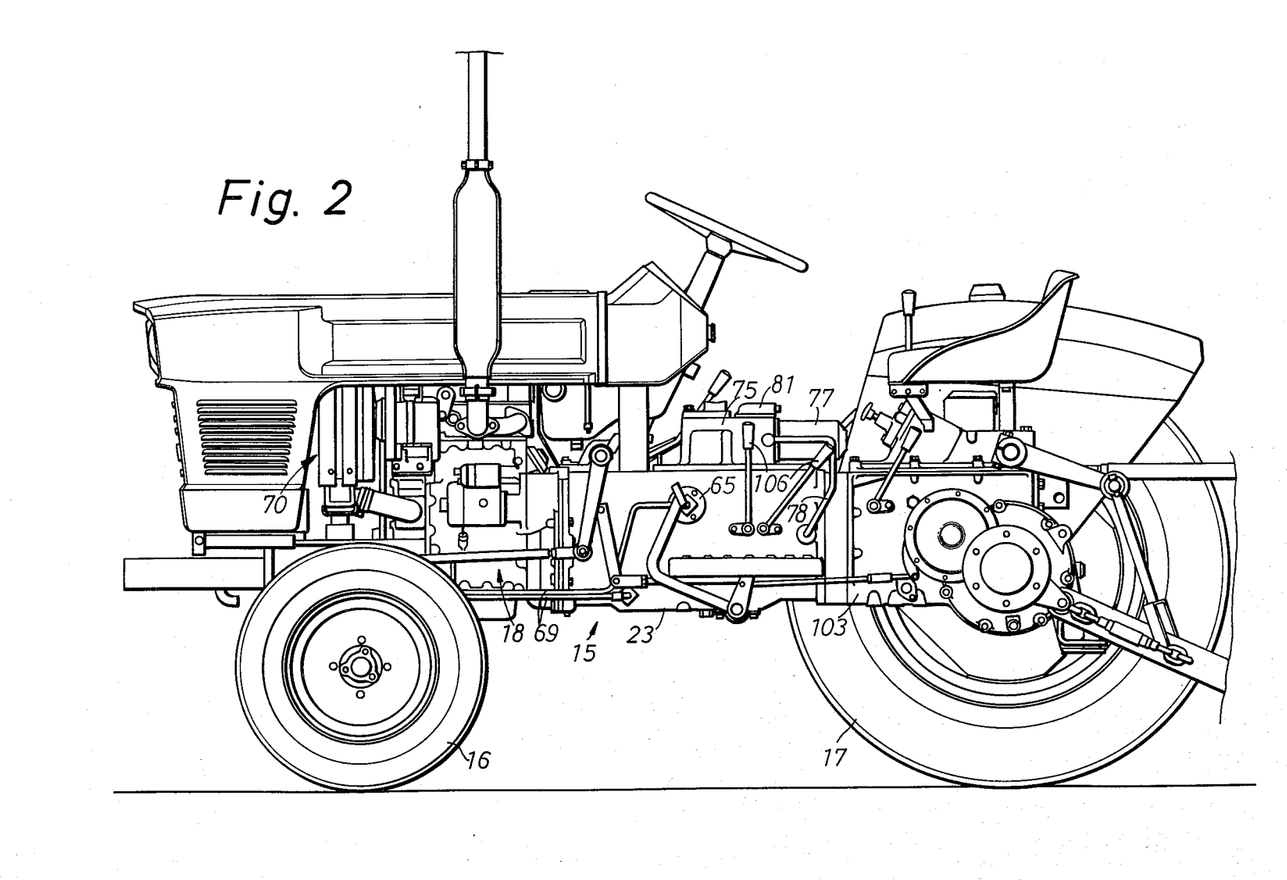
FIG. 2 is a side elevation showing the appearance of an agricultural tractor incorporating the transmission of this invention, with one of the drive wheels, i.e. the left rear wheel removed.
Figure 3:
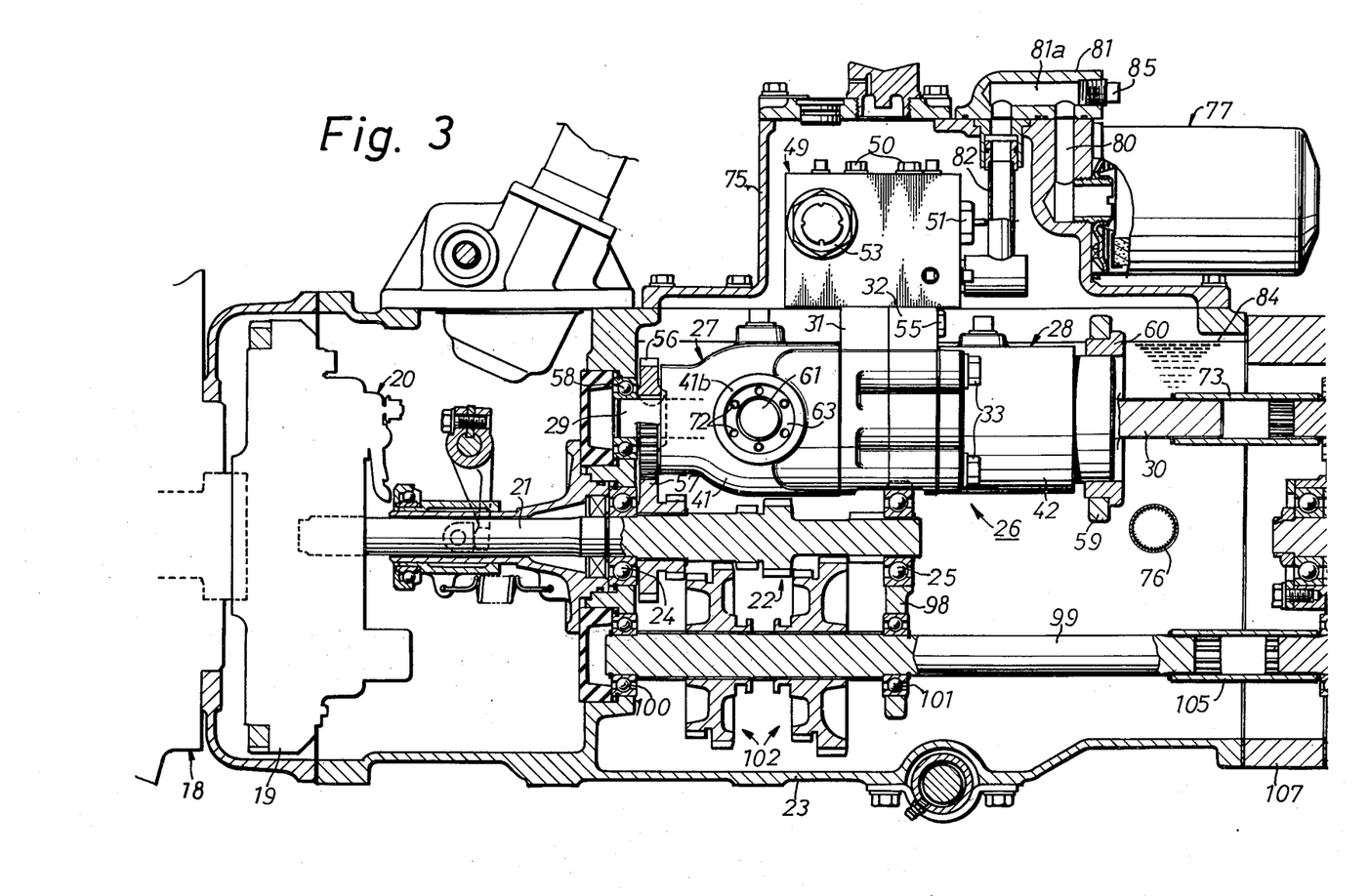
FIG. 3 is a side elevation showing a primary speed change means which is the principal part of this invention, the view showing the appearance of hydraulic transmission unit thereof.
Figure 4:
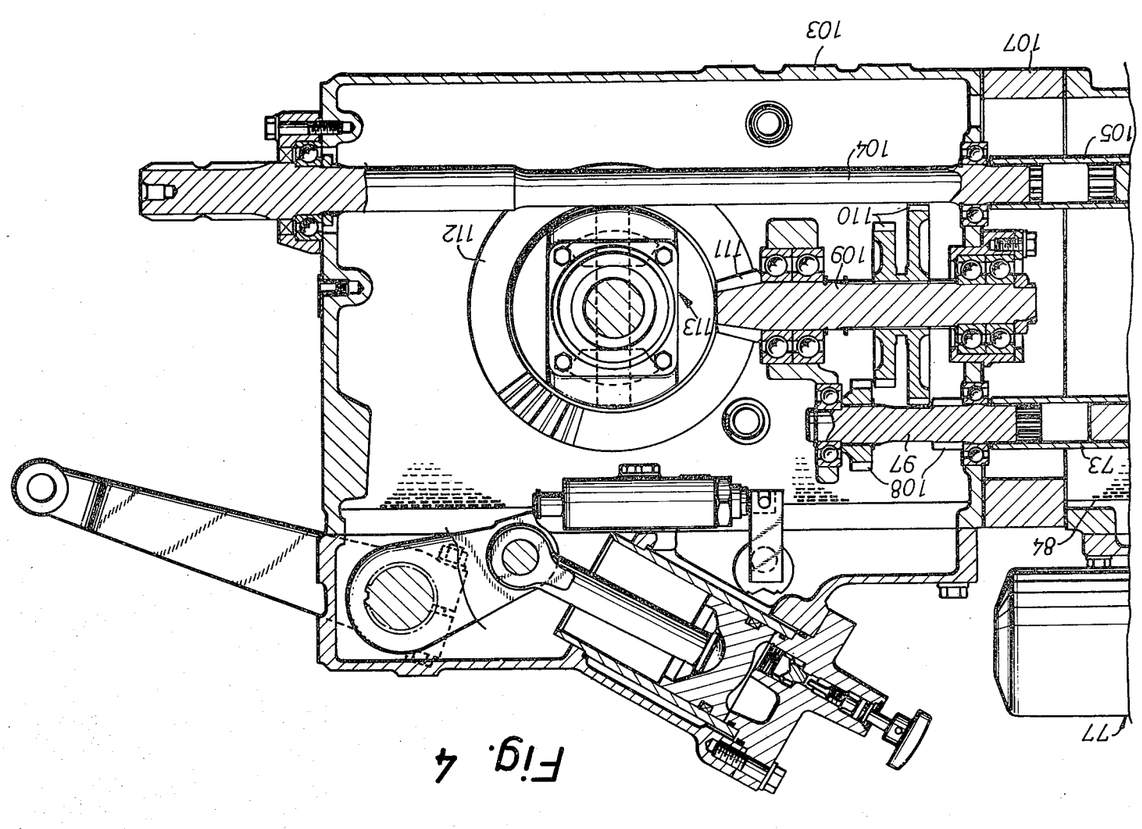
FIG. 4 is a side elevation showing the interior of secondary speed change means positioned in the rear of the primary speed change means.

With reference to FIGS. 2 to 4, indicated at 15 is a tractor frame, at 16 a front wheel and at 17 a rear wheel. The illustrated embodiment is an agricultural tractor of the type wherein the rear wheels 17 are driven. Mounted in the front portion of the tractor frame 15 is an engine 18 whose torque is transmitted to a main input shaft 21 by way of a flywheel 19 and a clutch 20. The main input shaft 21 carries a plurality of gears 22 for power transmission. The main input shaft 21 is disposed centrally of a primary transmission case 23 and supported by bearings 24 and 25.

A primary speed change means comprises the main input shaft 21, a tractor-driving speed change unit and a power takeoff speed change unit which are disposed in parallel to each other on the opposite sides of the shaft 21, i.e. at upper and lower positions in FIG. 3. The primary speed change means is housed in the primary transmission case 23 containing oil.

Figure 10:
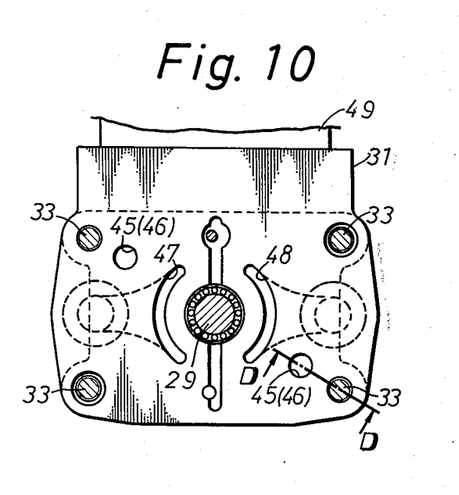
FIG. 10 is a view in section taken along the line C—C in FIG. 8.

According to this invention, a hydraulic transmission unit 26 is employed as the tractor-driving speed change unit. The unit 26 will first be described. As illusstrated in FIG. 8, the unit 26 comprises a capacity-variable hydraulic pump unit 27 of the axial plunger type and a constant-capacity hydraulic motor unit 28 which are separably fitted together, with center sections 31 and 32 clamped therebetween by set bolts 33 which are arranged in diagonally opposing relation as seen in FIG. 10, the shafts 29 and 30 of both the units being coaxial with each other. The center section 31 includes a charge pump 34 which is rotatable with the pump shaft 29 coaxially therewith.

Figure 11:
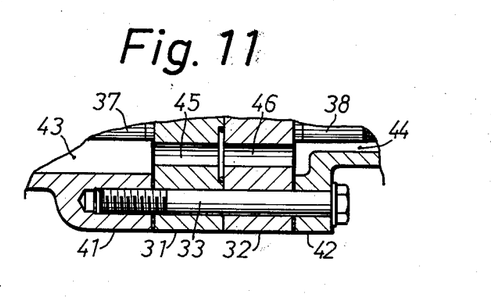
FIG. 11 is a view in section taken along the line D—D in FIG. 10.

As already well known, the hydraulic pump unit 27 and hydraulic motor unit 28 include essential components such as the shafts 29, 30, swash plates 35, 36, cylinder blocks 37, 38 and plungers 39, 40 respectively. In the illustrated embodiment, the hydraulic pump unit 27 and hydraulic motor unit 28 are covered with housings 41 and 42 respectively to provide pump and motor spaces 43 and 44 which communicate with each other via passages 45 and 46 formed in the center sections 31 and 32 as seen in FIG. 11. Of course, the plunger chambers of hydraulic pump unit 27 and hydraulic motor unit 28 communicate with each other by way of two oil passages 47 and 48 formed in the center sections 31 and 32 as shown in FIG. 10. In the illustrated embodiment, The swash plate 35 of the pump is made movable, whilst the swash plate 36 of the motor is stationary.

Figure 12:
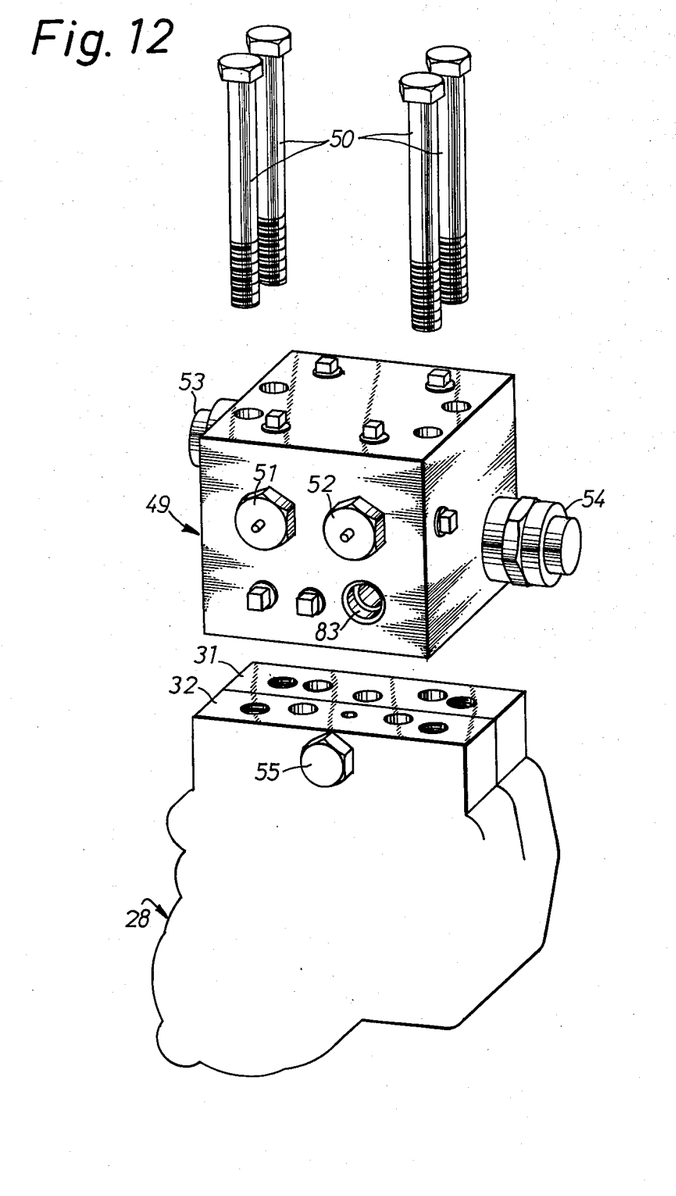
FIG. 12 is a perspective view showing the valve unit.

A valve unit 49 removably mounted on the center sections 31 and 32 by set bolts 50 includes two charge valves 51, 52 and two high pressure relief valves 53, 54 as seen in FIG. 12 and is formed with oil passages as will be described later. A charge relief valve 55 alone is provided in the center section 32, but the relief valve 55 is likewise mountable in the valve unit 49. The check valves and high pressure relief valves are provided each two in number for forward and reverse driving.

Figure 9:
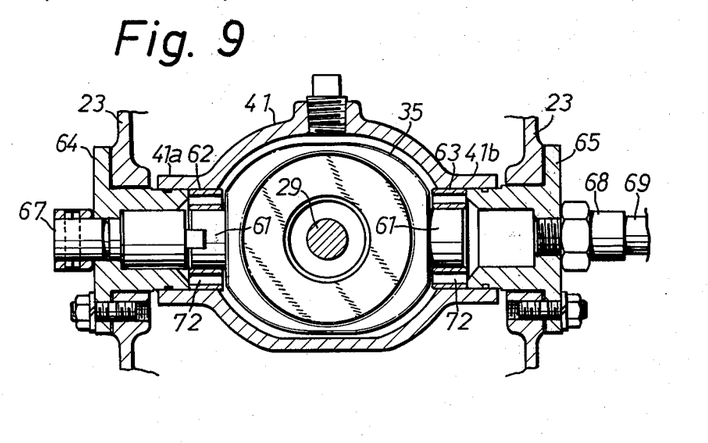
FIG. 9 is a view in section taken along the line B—B in FIG. 8 and showing a construction for supporting the hydraulic transmission unit on a transmission case.

The hydraulic transmision unit 26, with the valve unit 49 mounted on the center sections 31 and 32, is supported above the main input shaft 21 within the primary transmission case 23 as seen in FIG. 3. More specifically, the pump shaft 29 provided with a pump gear 56 is supported by a bearing 58, with the gear 56 meshing with a gear 57 fixedly mounted on the main shaft 21 all the time in the illustrated embodiment. The hydraulic motor unit 28 is provided with an annular support member 60 which is fitted in a support wall 59 projecting from the primary transmission case 23. In this way, the hydraulic transmission unit 26 is supported in place at its opposite ends. According to the illustrated construction, the hydraulic transmission unit 26 is further supported by the opposite side portions of housing 41 of the pump unit 27 being supported by the opposite side walls of the primary transmission case 23, whereby the unit 26 is made to withstand the torque acting thereon. With reference to FIG. 9 support tubes 41a and 41b project from the opposite side central portions of the pump housing 41 and support the pins 61 and 61 of swash plate 35 of the pump, with bushes 62 and 63 interposed therebetween. In opposing relation to the tubes 41a and 41b, support brackets 64 and 65 are provided on the primary transmission case 23. The tubular boss portions of the support brackets 64 and 65 are fitted in the support tubes 41a and 41b. Fitted in the support bracket 64 of the pair is a transmitting pivot 67 for operating the swash plate 35 through the manipulation of one rod 66 to be described later for operating the tractor-driving hydraulic transmission unit. The pivot 67 engages in a groove in one of the swash plate pins 61. Connected to the other support bracket 65 by means of a connector 68 is a piping member 69 which is connected to an oil cooler 71 (to be described later) located in front of a radiator 70 for cooling the engine in the front portion of the tractor frame 15 in FIG. 2. Accordingly, the bushes 62 and 63 are formed with several bores 72. The same bushes are usable as the bushes 62 and 63. However, the bush 62 need not be formed with the bores 72.

The hydraulic transmission unit 26 supported at its opposite ends to withstand the torque of rotation is in parallel to the main shaft 21 which transmits the power when the clutch 20 is engaged, such that the hydraulic pump unit 27, charge pump 34 and hydraulic motor unit 28 are aligned coaxially in series. Thus the rotation of the main shaft 21 rotates the pump gear 56 therewith to operate the hydraulic pump. As already known, the swash plate 35 changes the stroke of the pump plungers 39 to vary the resulting displacement, whereby the plungers of the hydraulic motor are displaced and the cylinder block is driven to change the rotational speed of the power transmission shaft steplessly.

The motor shaft 30 of the hydraulic transmission unit 26 is splined to deliver the torque by a coupling 73 to the counter shaft of secondary speed change means to be described later. To accommodate the hydraulic transmission unit 26 and valve unit 49 mounted thereon within the primary transmission case 23, the top of the case 23 has an opening 74. A covering member 75 as shown in FIG. 3 covering the valve unit 49 closes the opening 74 and is fixed in place by bolts or the like.

Figure 14:
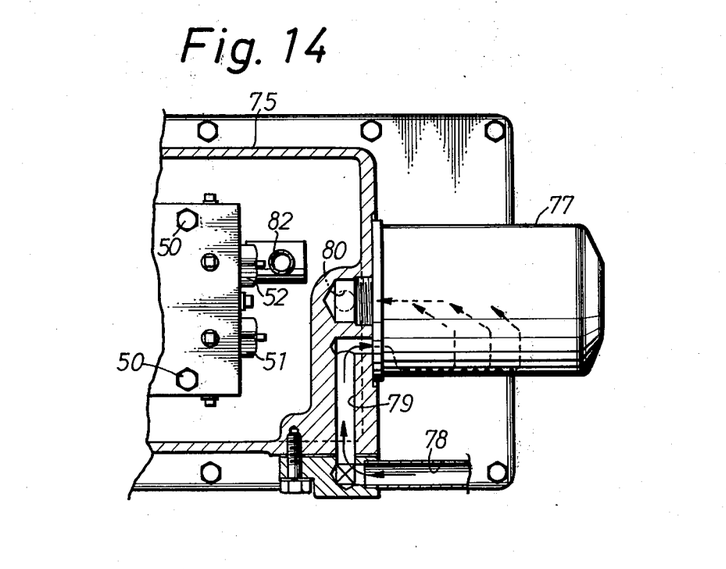
FIG. 14 is a view in section taken along the line E—E in FIG. 13.

As shown in FIGS. 3, 4, and 14, an oil filter 77 is removably attached to the rear wall of the covering member 75. The oil filter 77 coacts with an oil filter 76 disposed within the primary transmission case 23 to filter the oil. The former filter 77 is for example a 10-micron filter and the latter filter 76 is for example a 200-mesh filter. The oil is filtered by the latter filter 76 for primary filtration and then sent through a piping member 78 (see FIG. 2) and an oil passage 79 formed in the covering member 75 to the former filter 77 shown in FIG. 14 for secondary filtration. Subsequently, the cleaned oil is passed through an oil passage 80 formed in the covering member, a communicating member 81 provided on the covering member and having a communicating oil passage 81a and a piping member 82 to an inlet 83 in the valve unit 49 (see FIGS. 3 and 4). For the filtration of oil, relatively large pieces of dust is first filtered off by the primary filter 76 and finer dust is subsequently separated off by the secondary filter 77, with the result that working oil free from objectionable dust can be fed to the hydraulic unit, lending itself to longer service life of the unit. The primary filter 76 is positioned sufficiently below the oil level 84 and inserted into the primary transmission case 23 from outside, so that it is very easy to clean the filter. If the upper connector for the piping member 78 serving as an inlet conduit for the filter 77 is removed, the piping member 78 can then be used as a drain pipe.

On the other hand, the secondary filter 77 is removably attached to the covering member 75 and is positioned above the level 84 of the reserved oil. It is noted that the oil passage 80 and piping member 82 between the secondary filter 77 and the valve unit 49 are connected by the communicating member 81 having the communicating passage 81a. Moreover, a plug 85 is removably fitted in part of the passage of oil, namely in the communicating passage 81a in the illustrated embodiment so as to make the passage communicate with the atmosphere. To remove the secondary oil filter 77 for maintenance and inspection, the plug 85 is first removed. This causes air to enter the oil passage 80 and also into the oil filter 77, whereupon the working oil filling the interior flows down under gravity, almost emptying the interior of filter 77 and permitting a very small amount of oil to remain therein. Thus the filter 77 can be removed without causing outflow of oil over the mounting surface that will waste the oil or stain the neighboring area. Further a new filter, when mounted, can be primed to release air therefrom by supplying working oil through the plugged portion.

Figure 13:
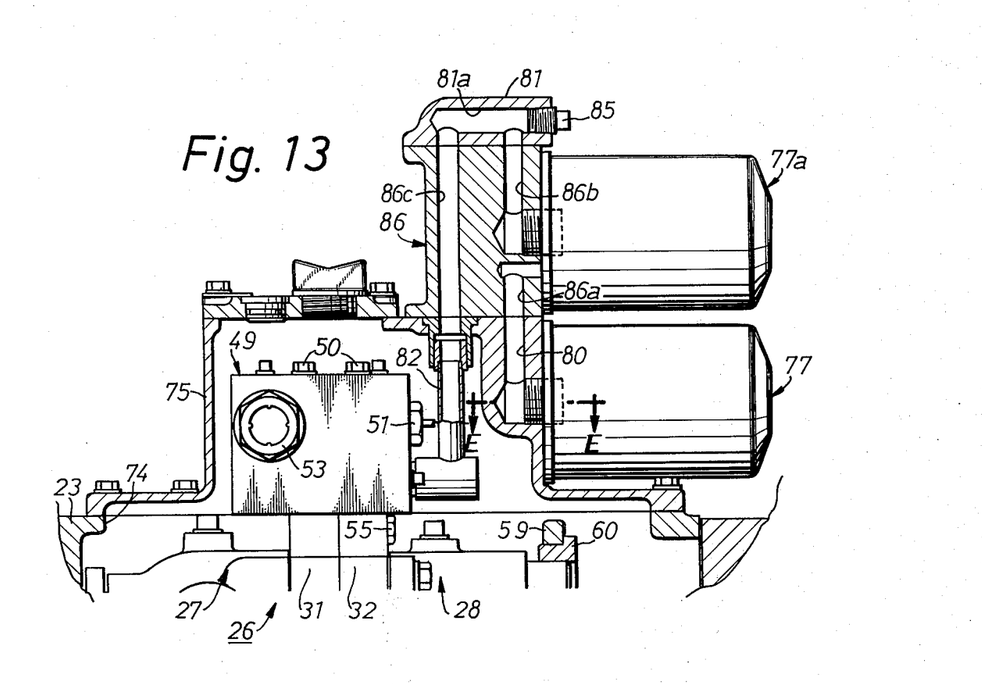
FIG. 13 is a fragmentary view in section showing another arrangement of filter means.

As illustrated in FIG. 13, the communicating member 81 may be replaced by an adaptor 86 hving an inlet passage 86a, outlet passage 86b and intermediate passage 86c, with another oil filter 77a attached to the adaptor 86, the replaced communicating member 81 further being mounted on the adaptor 86 as shown. In this way, a plurality of oil filters can be mounted in parallel without using exposed oil piping members.

Figures 6, 7:
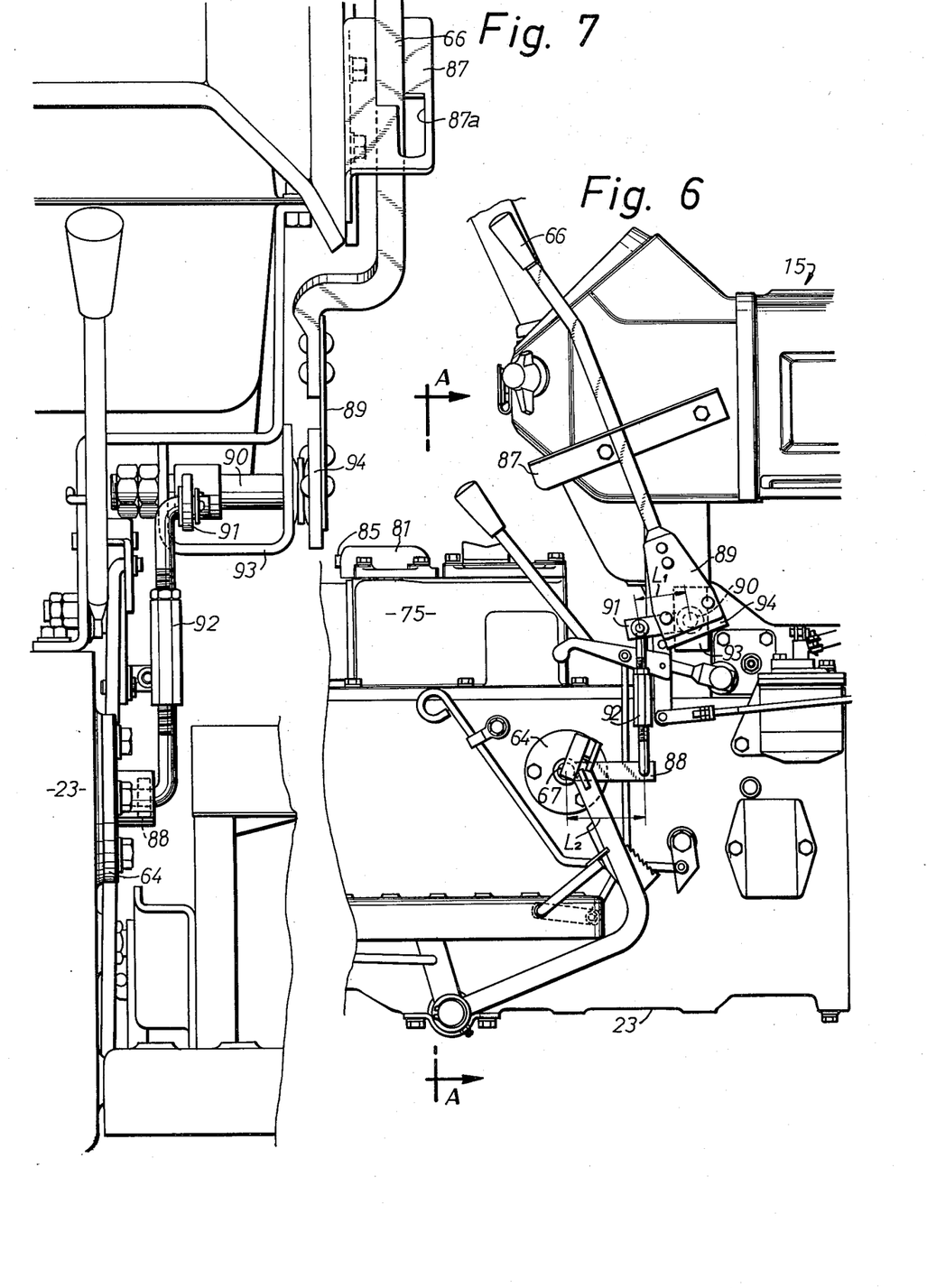
FIG. 6 is a fragmentary side elevation showing a lever mechanism for operating the hydraulic transmission.
FIG. 7 is an enlarged view as seen in the direction of arrows A—A in FIG. 6.

FIGS. 6, 7 and 9 show a speed change mechanism for controlling the hydraulic pump of the hydraulic transmission unit 26. The mechanism comprises one operating rod 66, a guide plate 87 for the rod 66, a swash plate lever 88 secured to the aforementioned pivot 67, a spring member 89 made for example of plate spring and attached to the lower end of the operating rod 66, a driving lever 91 attached at its one end to the spring member 89 by a pin member 90, and a connecting member 92 as of the turnbuckle type for interconnecting the free ends of the swash plate lever 88 and the driving lever 91. As indicated in FIG. 6, the driving lever 91 has a length $L_1$, whilst the swash plate lever 88 has a length $L_2F_1$ being smaller than $L_2$. The lower end of the rod 66 is connected to the upper end of the spring member 89 at a position which is as remote as possible from the fixed support point (i.e. the position of the pin member 90) of the operating rod 66 so that the spring force of the spring member 89 will assure frictional contact between the rod 66 and the groove edge 87a of the guide plate 87. The guide plate 87 itself is also made of a plate spring or the like and is positioned as remote as possible from the fixed support point. The spring member 89 is supported through a mounting member 94 by a channel member 93 fixed to the frame so as to be movable with the pin member 90 to which one end of the driving lever 91 is pivoted. Accordingly, when moved, the operating rod 66 turns the driving lever 91 along with the pin member 90 about the position of the pin. This turning force is delivered through the connecting member 92 to the swash plate lever 88. Inasmuch as the swash plate lever 88 has a greater length than the driving lever 91, the turning force of the driving lever 91, even if small, gives a great moment to the swash plate lever 88 to turn the same about the axis of the pivot 67. The operating rod 66 is very easy to operate therefore. The neutral position can be adjusted easily and accurately by means of the connecting member 92 of the turnbuckle type.

The hydraulic transmission operates for stepless speed change in the manner already described. The pressure of the hydraulic transmission may turn the swash plate lever 88 about the pivot 67 to give moment of rotaion to the driving lever 91 through the connecting member 92, possibly causing the operating rod 66 to move erroneously. Since $L_2$ is greater than $L_1$ according to this invention, the moment of rotation is extremely small. In addition the spring force of the spring member 89 causes the operating rod 66 to bear against the groove edge 87a of the guide plate 87 with friction. Conseuqently, the hydaulic transmission is prevented from acting reversely on the operating rod to cause erroneous movement.

Figure 15:
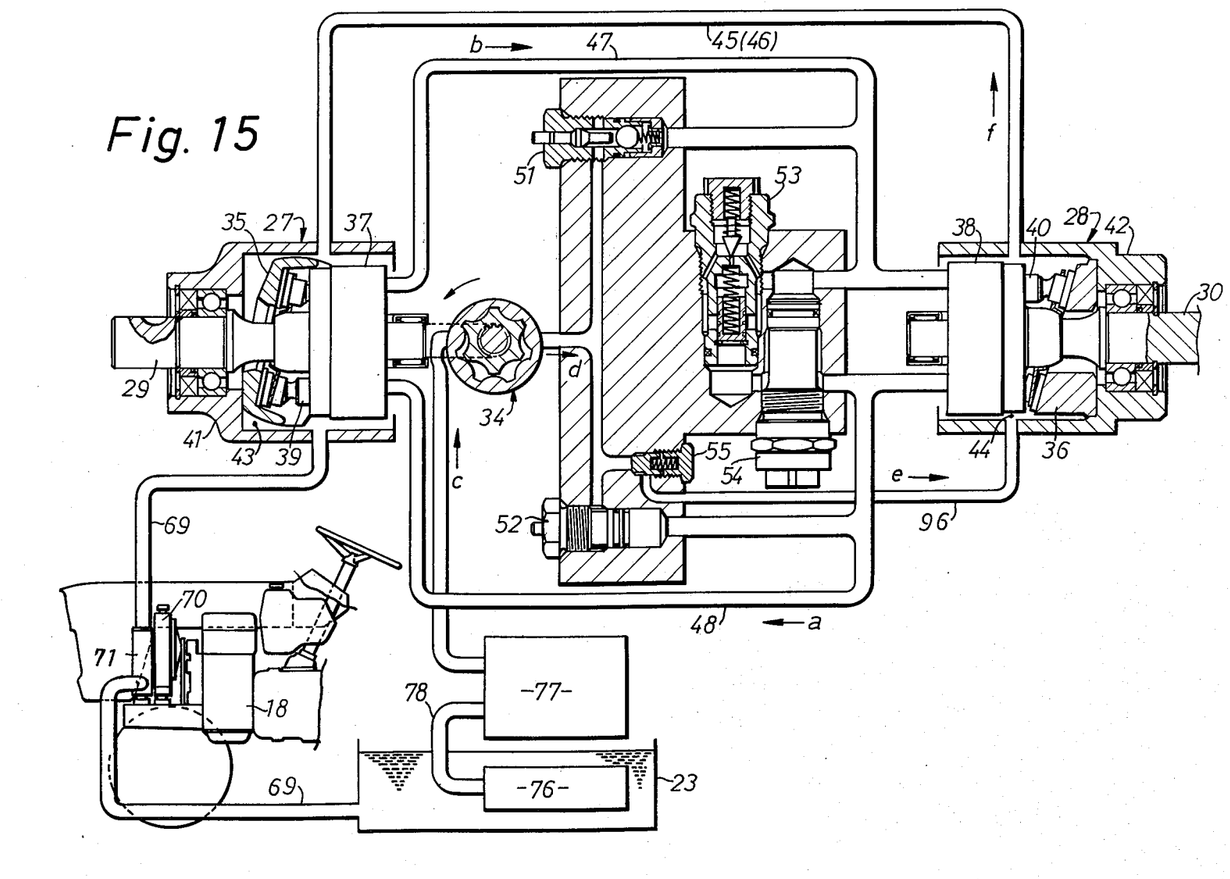
FIG. 15 is a hydraulic circuit diagram.

With reference to FIG. 15, the flow of working oil within the hydraulic transmission unit 26 will be described when the tractor is driven forward. As already described, the pump shaft 29 operates to drive the hydraulic pump unit 27 of the capacity-variable type. The oil flows in the direction of the arrows a and b in FIG. 15 through a closed circuit including the oil passages 47 and 48 formed in the center sections 31 and 32 to hydraulically connect together the plunger chambers of the hydraulic pump unit 27 and hydraulic motor unit 28, the former 47 being higher than the latter in hydraulic pressure, whereby the hydraulic pump unit 27 and the hydraulic motor unit 28 are operatively connected together to give static hydraulic drive means as conventionally known and to thereby drive the tractor at steplessly variable speeds. The torque is therefore delivered from the motor shaft 30, serving as an output shaft, to rear drive wheels 17 by way of secondary speed change means and differential gear means to be described later. The charge pump 34, provided to compensate for the leak from the capacity-variable pump unit 27, is disposed coaxially wit the pump shaft 29 in operative relation thereto. The oil 84 contained in the primary transmission case 23 is filtered by the primary filter 76 and secondary filter 77, then sent into the inlet port of the charge pump 34 as indicated by the arrow c in FIG. 15 wherein it is pressurized. The oil is subsequently sent out therefrom through its outlet port, passed through a passage 95 and is forced into the charge check valves 51 and 52. If the pressure of working oil in the oil passage 48, the low-pressure circuit, is lower than in the passage 95, the ball valve is opened against the spring of check valve 52 in the low-pressure circuit to replenish the oil until the pressure of passage 48 is brought into balance with that of the oil passage 95, whereupon the spring acts to close the ball valve. On the other hand, since the charge pump 34 still continues to operate, the closing valve element is opened against the spring in the charge relief valve 55, permitting oil to be forced through a passage 96 into the interior space 44 of the motor as indicated by the arrow e in FIG. 15. The oil sent into the motor space 44 and oil leaking from some parts of the motor are forced into the pump space 43 through the passages 45 and 46 in the center sections 31 and 32 through which the space 44 communicates with the pump space 43. This flow is indicated by the arrow $f$ in FIG. 15. The oil admitted into the pump space 43 and oil leaking from some parts of the pump are sent back to the oil tank, namely the primary transmission case 23, through a return passage through which the space 43 communicates with the case 23. The piping member 69 shown in FIGS. 2 and 9 serves as the return passage. As seen in FIG. 2, the piping member 69 extends to the front of the tractor frame. In front of the radiator 70 in proximity thereto, there is provided the aforementioned oil cooler 71 into which the oil is forced by the discharge pressure of the relief valve 55 for the charge pump 34, the oil cooler 71 being interposed between the relief valve 55 and the oil tank. The oil cooler 71 is adapted to be cooled by the radiator 70 for cooling the engine.

If any failure occurs in the hydraulic motor unit 28 and the oil passages, causing the pressure in the high-pressure oil passage 47 to build up to an abnormal level, the high pressure relief valve 54 of course fuctions to release the abnormal pressure to the low-pressure passage. Thus the valve disc of the high pressure relief valve 54 moves against its spring to release the abnormal pressure into the low-pressure passage through pores formed in the valve body. Incidentally, FIG. 15 shows the flow of oil when the tractor is driven forward. The two charge check valves 51 and 52 and the two high pressure relief valves 53 and 54 are exactly identical in construction respectively. The spring, valve ball, valve disc and pores will be apparent from the sectional views of the charge check valve 51 and the pressure relief valve 53. Further when the tractor is driven in the reverse direction, the high-pressure oil passage 47 and the low-pressure oil passage 48 will be reversed.

Figure 8:
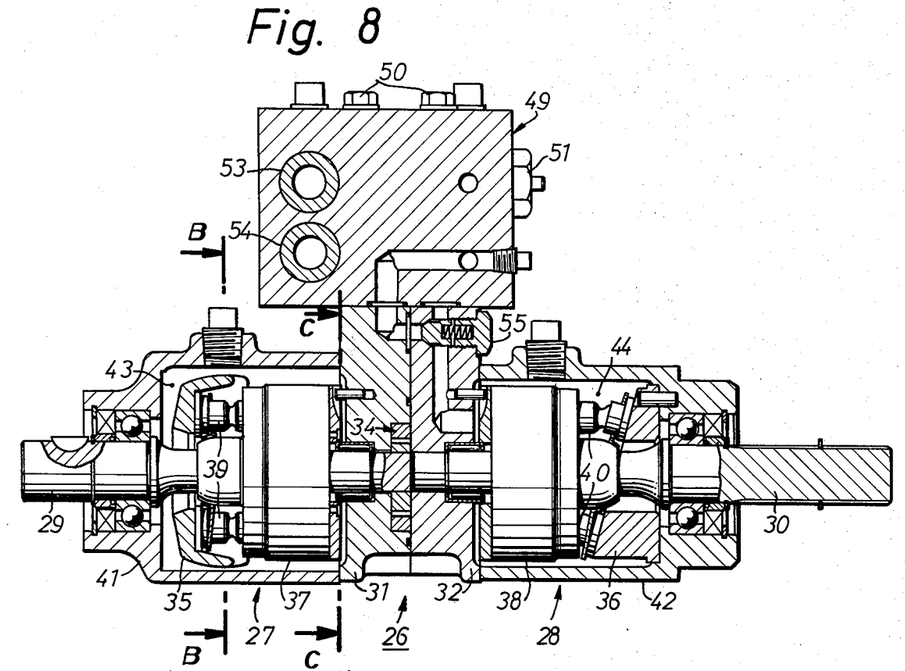
FIG. 8 is a side elevation in section showing the hydraulic transmission unit equipped with a valve unit, the view showing the cylinder blocks of a hydraulic motor and a hydraulic pump.

In the hydraulic circuit of the construction described, exposed components thereof are the piping member 78 connecting the primary filter 76 to the secondary filter 77 and the piping member 69 connecting the pump space 43 to the primary transmission case 23 serving as an oil tank as will be apparent from the foregoing description, whilst the other components are formed in the center sections 31 and 32 and valve unit 49 by drilling as seen in FIGS. 4, 8 and 12. As a result, the constuction minimizes complex bent piping members conventionally used and eliminates the need to separate the connections of the piping members for repair, inspection and maintenance of the hydraulic transmission unit 26.

Figure 16:
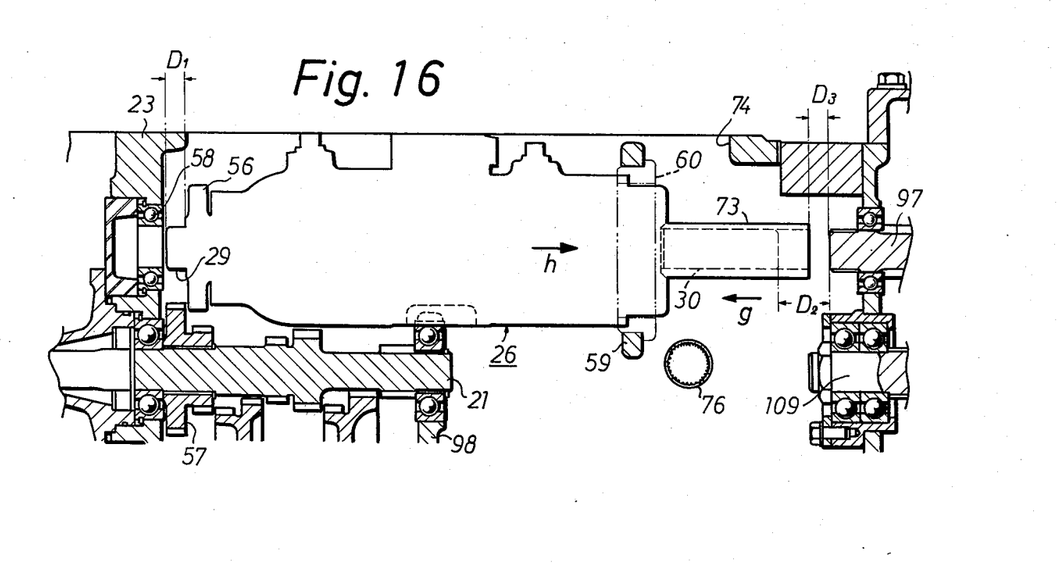
FIGS. 16 and 17 are views illustrating the procedure to remove the hydraulic transmission unit in sequential order.

Maintenance and inspection of the hydraulic transmission unit 26 will be described in detail with reference to FIGS. 16 and 17. It is seen that the length $D_1$ of the pump shaft 29 received in the bearing 58 is smaller than the space $D_2$ between the end of the motor shaft 30 and the end of the counter shaft 97 of the secondary speed change means. Further even when the unit 26 is displaced backward in its entirety as seen in FIG. 16 there still remains a space $D_3$. The motor housing 42 is supported by the support wall 59 indirectly, with the annular support member 60 interposed therebetween, the motor shaft 30 and the counter shaft 97 being connected together by the splined coupling 73. (see FIGS. 2 and 3).

To take out the hydraulic transmission unit 26 from the primary transmission case 23, the covering member 75 for the opening 74 and the brackets 64 and 65 supporting the opposite sides of the pump housing 41 are removed. Preferably the pump gear 56 may thereafter be removed. Subsequently, the coupling 73 (and stop ring) is moved along the motor shaft 30 in the direction of the arrow $g$, and the support member 60 is removed. The hydraulic transmission unit 26 is then wholly moved in the axial direction as indicated by the arrow $h$, whereby the pump shaft 29 is pulled out from the bearing 58. To avoid interference between the hydraulic transmission unit 26 and a wall 98 for supporting the main shaft 21 and the power takeoff speed change shaft to be described later, the center sections 31 and 32 are recessed in their under surfaces.

Figure 17:
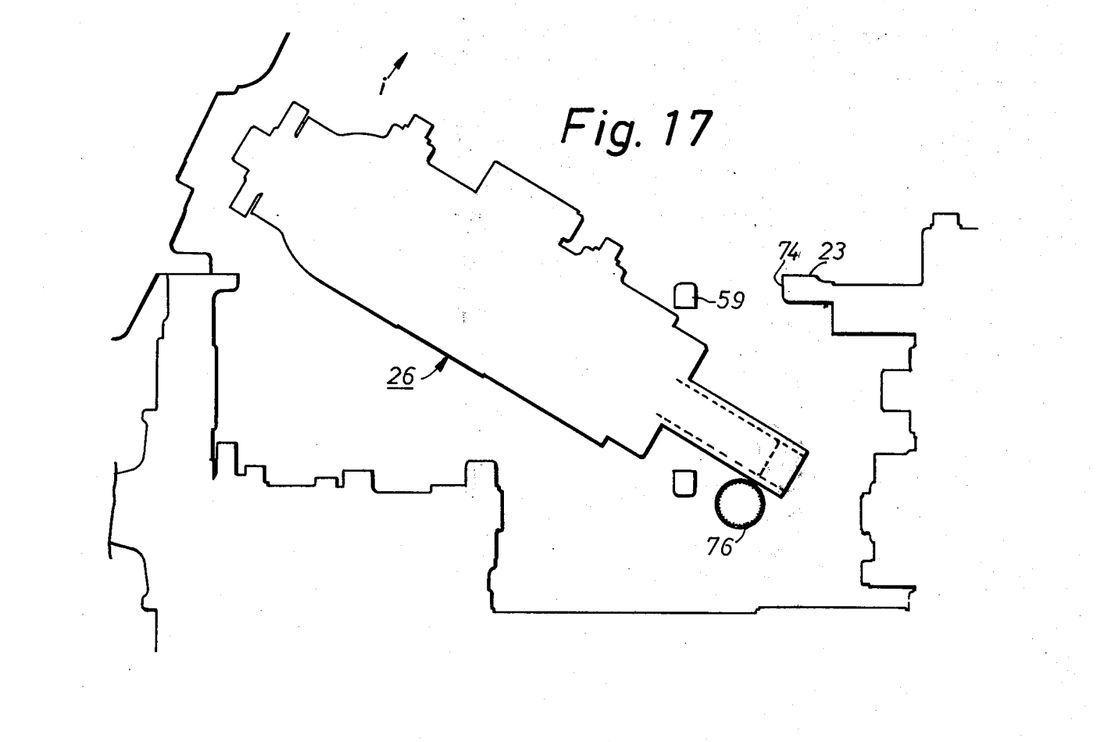

After the unit is brought to the position illustrated in FIG. 16, the pump shaft 29 and motor shaft 30 are grasped, and the unit is lifted at the pump unit side as shown in FIG. 17 to expose the pump housing 41 from the opening 74. The hydraulic transmission unit 26 is then moved forward in its entirety and is thereafter turned as indicated by the arrow $i$ so as to move out the motor shaft 30 from the support wall 59. Thus the whole unit will be removed generally in horizontal posture. The unit will be set in position in the reverse manner to the above.

The tractor-driving speed change unit comprising the hydraulic transmission unit 26 and the power takeoff speed change unit are supported in parallel, with the main input shaft 21 interposed therebetween. The power takeoff speed change unit will now be described. As shown in detail in FIGS. 2 and 3, the power takeoff speed change unit includes apower takeoff speed change shaft 99 located at a lower position in the drawing in parallel to the main input shaft 21 and supported by bearings 100 and 101. The speed change shaft 99 caarries thereon power takeoff speed change gears 102 selectively meshable with the gears 22 on the main input shaft 21 and slidable in the axial direction, The shaft 99 extends backward and is splined for connection with a known power takeoff shaft 104 by means of a coupling 105, the shaft 104 being supported by a secondary transmission case 103. When slidingly shifted by known power takeoff speed change rods 106 (see FIG. 2), the power takeoff gears 102 will mesh with the gears 22 on the main input shaft 21 selectively to give first to fourth PTO speeds in the illustrated embodinent.

With reference to FIG. 4, the secondary transmission case 103 is firmly secured by unillustrated bolts or the like to the rear of the primary transmission case 23, with a spacer member 107 interposed therebetween. The secondary transmission case 103 supports the secondary speed change counter shaft 97 carrying gears 108 and positioned in alignment with the rear extension of axis of the hydraulic transmission unit 26. As already described, the counter shaft 97 is spaced apart from the motor shaft 30 by a desired distance and connected thereto by the coupling 73. A bevel pinion shaft 109 is provided below and in parallel to the counter shaft 97 and carries secondary speed change gears 110 slidably thereon. As already known, a bevel pinion 111 meshing with a bevel gear 112 delivers the power via differential gear means 113 to the rear wheels 17 and 17, i.e. drive wheels.

Figure 5:
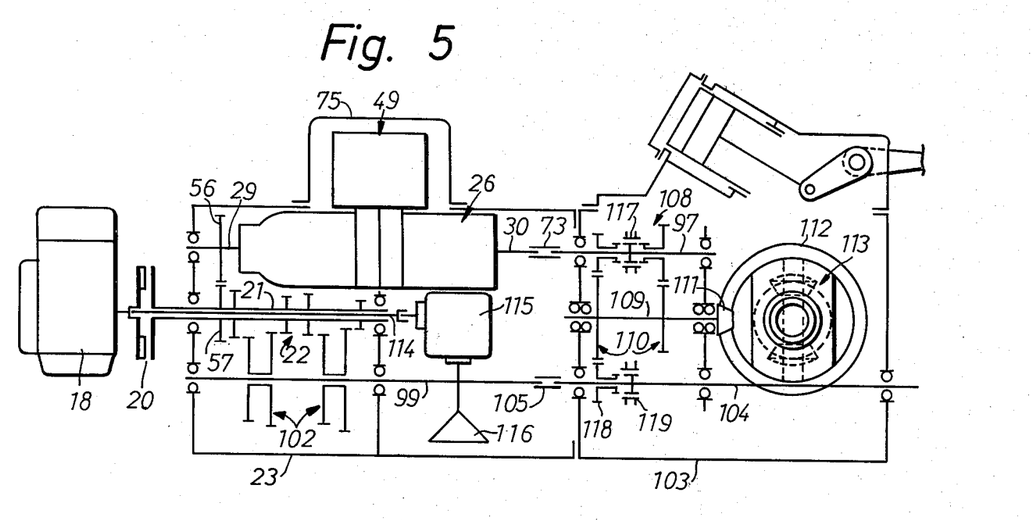
FIG. 5 is a schematic diagram showing a useful modified embodiment of this invention and corresponding to the combination of FIGS. 3 and 4.

FIG. 5 shows a useful modified embodiment of this invention. The main input shaft 21 of the illustrated embodiment is in the form of a hollow shaft which accommodates along its axis of a hydraulic pump drive shaft 114 directly connected to the flywheel of the engine 18 and to a hydraulic pump 115 for work implements. With this construction, the power from the engine 18 drives the hydraulic pump 115 independently of the engagement and disengagement of the clutch 20. While the oil 84 in the primary transmission case 23 is being filtered by a filter 116, a work implement having hydraulic means can be operated as desired entirely independently of the travel of the tractor, hence advantageous when the implement is used while the tractor is held in a fixed position.

Further according to the illustrated embodiment, gears 108 are idly rotatable on the secondary speed change counter shaft 97, with a slidable clutch 117 interposed between the gears 108, whereas the gears 110 are fixedly mounted on the bevel pinion shaft 109 for meshing engagement with the gears 108, the construction being such that the slidable clutch 117 is shifted to cause one of the gears 108 to deliver the power from the motor shaft 30 to the bevel pinion shaft 109. Further according to the embodiment of FIG. 5, the power takeoff shaft 104 carries thereon an idly rotatable gear 118 meshing with one of the gears 110 on the bevel pinion shaft 109 and is provided with a slidable clutch 119. The clutch 119 is shifted to render the idle gear 118 rotatable with the power takeoff shaft 104, whereby when the power is not transmitted to the bevel pinion shaft 109 from the hydraulic transmission, the power can be delivered to the shaft 109 from the power takeoff speed change shaft 99. This assures an advantage when the hydraulic transmission unit fails to operate.

Further with the slidable clutch 117 in neutral position, the tractor 15 can be trailed by another tractor to rotate the engine by way of the drive wheels 17, 17, bevel pinion shaft 109, power takeoff shaft 104, power takeoff speed change shaft 99 and main input shaft 21.

With the present invention having the foregoing construction, the torque of the engine 18 transmitted to the main input shaft 21 by virtue of engagement of the clutch 20 drives the hydraulic pump 27 through the meshing engagement of the gear 57 on the shaft 21 with the pump gear 56. When the one hydraulically speed changing rod 66 is then manipulated, the hydraulic motor 28 hydraulically connected to the pump 27 geives steplessly variable speeds, ranging from zero to the highest speed, which are transmitted to the bevel pinion shaft 109 through the secondary speed change counter shaft 97, gears 108 and 110 to the bevel pinion shaft 109 to drive the rear wheels 17 and 17. On the other hand, the speed change shaft 99 is given the torque with the speed change effected by virtue of selective meshing of the gears 22 with the gears 102, making it possible to take off the power from the power takeoff shaft 104 which is coaxial with the speed change shaft 99.

As already apparent, the speed change unit for driving the tractor and the speed change unit for power takeoff are provided on the opposite sides of the main input shaft 21, the former comprising a hydraulic transmission unit and the latter comprising a gear system. Inasmuch as both the speed change units are positioned in parallel to each other with the main shaft 21 interposed therebetween in this way, the main shaft is serviceable for both the units. With the present invention, stepless speed change is available since the hydraulic transmission employed for driving power transmission system is controllable by one operating rod for stepless speed change. The hydraulic transmission including the hydraulic pump, charge pump and hydraulic motor which are aligned coaxially is therefore compact in design and advantageous to install in a narrow space and to remove therefrom. Moreover, the hydraulic pump and hydraulic motor are fitted together with the center sections clamped therebetween in which the charge pump and oil passages are provided. The valve unit which is mounted removably on the center sections are also formed with oil passages. Thus the present construction can greatly simplify the piping system which would otherwise be complex to provide oil passages. It is to be further noted that with the hydraulic transmission, the transmission case per se is used as an oil tank and that the means for cleaning and for cooling the oil as required for hydraulic transmission are composed of a minimum number of parts, making it possible to provide a compact transmission for tractors. The hydraulic transmission which does not include any complex piping system has another advantage of being easy to maintain and inspect.

Various advantages of this invention will be fully understood from the foregoing description. Modifications and alterations can of course be made in construction without departing from the scope of the invention as defined in the appended claims. For example, the valve unit may be made integral with the covering member. For improved maintenance of valves, they may be provided with windows in facing relation thereto to set pressure gauges therefor. The operating rod for the hydraulic means may be square in cross section and the guide plate therefor may be adapted to prevent minute vibration of the rod.

What is claimed is:

1. A transmission comprising the three systems of an input system including a main input shaft operable to transmit power when a clutch is engaged and provided with a plurality of gears; a driving speed change system comprising a hydraulic pump and a hydraulic motor hydraulically connected to the hydraulic pump, the hydraulic pump including a pump gear meshing with one of the gears of the input system; and a power takeoff speed change system including a power takeoff speed change shaft having a suitable number of gears meshable with the gears of the input system; the driving speed change system and the power takeoff speed change system being supported in parallel to each other in the input system interposed therebetween, characterized by a hydraulic transmission unit comprising a capacity-variable hydraulic pump unit including a pump shaft and a hydraulic motor unit of constant capacity including a motor shaft, the pump shaft being fixedly provided with a pump gear meshing with the gear of the input system, the pump shaft and the motor shaft being coaxially aligned with each other, a center section being provided between and held by the units in a readily detachable manner and incorporating a charge pump mounted on the pump shaft, the pump unit, charge pump and motor unit being arranged in series, the hydraulic transmission unit serving as the driving speed change system and being housed in a transmission case and thereby supported removably, the transmission further being characterized by a valve unit removably mounted on the center section of the hydraulic transmission unit.

2. A transmission as set forth in claim 1, wherein the hydraulic transmission unit is supported at its front and rear portions and the transmission case is provided with support brackets for supporting the opposite side portions of the hydraulic transmission unit.

3. A transmission as set forth in claim 1 wherein the pump shaft of the hydraulic transmission unit is supported by a bearing, and a space greater than the axial length of the pump shaft received in the bearing is provided between the end of the motor shaft and a shaft end opposing the motor shaft, the motor shaft being connectable to the opposing shaft end by a coupling extending over the space.

4. A transmission as set forth in claim 1 wherein a pump space and a motor space are formed in a housing for the hydraulic pump unit and in a housing for the hydraulic motor unit respectively, and the center section is formed with oil passages through which the spaces communicate with each other.

5. The transmission as set forth in claim 1 wherein center sections are clamped between a housing for the hydraulic pump and a housing for the hydraulic motor and the center sections are formed with oil passages through which a hydraulic pump space within the housing communicates with a hydraulic motor space within the housing.

6. The transmission as set forth in claim 1 wherein a speed change controlling mechanism is provided for the hydraulic transmission unit including the hydraulically connected hydraulic pump and the hydraulic motor, the controlling mechanism including a swash plate lever for controlling the hydraulic pump, a driving lever attached to an operating rod by a spring member and a connecting member connecting the swash plate lever to the driving lever, the driving lever having a shorter length than the swash plate lever, the spring member having a spring force to prevent the swash plate lever from driving the operating rod.

7. The transmission as set forth in claim 1 further comprising means for cooling working oil including a cooling duct through which a relief valve for the charge pump for the hydraulic pump communicates with an oil tank and an oil cooler disposed at an intermediate portion of the duct and cooled by a radiator for cooling the engine of the tractor.

8. The transmission as set forth in claim 1 wherein the hydraulic transmission unit is housed in a transmission case serving as an oil tank, the transmission case having therein a primary filter and a secondary filter having a higher filtering ability than the primary filter is attached to a covering member for the transmission unit.

9. The transmission as set forth in claim 8 wherein the secondary filter is positioned at least above the oil level in the transmission case.

10. The transmission as set forth in claim 9 wherein a communicating member having a communicating passage is disposed between the secondary filter and a valve unit mounted on the hydraulic transmission unit to provide an oil passage.

11. The transmission as set forth in claim 10 wherein a plug is removably attached to the communicating member to cause the oil passage to communicate with the atmosphere through the plugged portion.

* * * * *